(12) United States Patent
Verdirame (10) Patent No.: US 9,936,829 B2
(45) Date of Patent: Apr. 10, 2018

(54) SYSTEM FOR SELECTING FOOD TYPES (71) Applicant: PediaPlate, Inc., Las Vegas, NV (US)

(72) Inventor: Alison Verdirame, Las Vegas, NV (US)

(73) Assignee: Pediaplate Inc., Las Vegas, NV (US)

( * ) Notice: Subject to any disclaimer, the term of this patent is extended or adjusted under 35 U.S.C. 154(b) by 134 days.

(21) Appl. No.: 14/683,219

(22) Filed: Apr. 10, 2015

(65) Prior Publication Data
US 2015/0289689 A1 Oct. 15, 2015

Related U.S. Application Data

(60) Provisional application No. 61/977,767, filed on Apr. 10, 2014.

(51) Int. Cl.
*G09B 19/00* (2006.01)
*A47G 19/02* (2006.01)
*G09B 5/02* (2006.01)

(52) U.S. Cl.
CPC ............. *A47G 19/025* (2013.01); *G09B 5/02* (2013.01); *G09B 19/0092* (2013.01)

(58) Field of Classification Search
USPC .......... 434/127; 206/562–564; 220/574, 575; 426/119, 120; 600/300; D7/555.1, 555, D7/556
See application file for complete search history.

(56) References Cited

U.S. PATENT DOCUMENTS

| | | | | |
|---|---|---|---|---|
| 924,209 | A * | 6/1909 | Wolfer | B65D 21/0204 220/23.4 |
| D194,054 | S * | 11/1962 | Grossman | D7/556 |
| D200,867 | S * | 4/1965 | Haifley | D7/555 |
| 3,532,247 | A * | 10/1970 | Bridges | B65D 81/3834 206/217 |
| 4,075,769 | A * | 2/1978 | Young | A47G 19/025 220/23.8 |
| 4,232,789 | A * | 11/1980 | Springer | A47J 39/006 206/562 |
| 4,323,110 | A * | 4/1982 | Rubbright | F25D 23/12 165/201 |
| 5,274,216 | A * | 12/1993 | DeGrow | A23L 3/365 165/918 |
| 5,560,653 | A * | 10/1996 | Beppu | B42D 15/00 283/117 |
| 6,296,488 | B1 * | 10/2001 | Brenkus | A47G 19/025 206/459.5 |
| 7,044,739 | B2 * | 5/2006 | Matson | G09B 19/0092 434/127 |
| 7,201,579 | B1 * | 4/2007 | Boyum | G09B 19/0092 434/127 |
| 7,908,181 | B2 * | 3/2011 | Dotson | G06Q 30/02 220/575 |
| 8,226,415 | B2 * | 7/2012 | Morris | G09B 19/0092 434/127 |
| 8,876,515 | B2 * | 11/2014 | Kohl | B29C 45/2673 425/185 |

(Continued)

*Primary Examiner* — Kurt Fernstrom
(74) *Attorney, Agent, or Firm* — Stine Law Ltd.

(57) ABSTRACT

A system for assisting a user in selecting food types for a balanced meal is disclosed. The system comprises a plate having a plurality of food type segments. Each of the food type segments is associated with a particular one of the food types.

4 Claims, 6 Drawing Sheets

(56) References Cited

U.S. PATENT DOCUMENTS

| | | | |
|---|---|---|---|
| 2007/0289973 A1* | 12/2007 | Acosta | A47G 19/025 220/507 |
| 2012/0009551 A1* | 1/2012 | Pinnisi | G09B 19/0092 434/127 |
| 2012/0031805 A1* | 2/2012 | Stolarczyk | A47J 39/006 206/541 |
| 2014/0004484 A1* | 1/2014 | Austin-Stephens | G09B 19/0092 434/127 |

* cited by examiner

SYSTEM FOR SELECTING FOOD TYPES

FIELD OF INVENTION

The present invention is directed to a method, apparatus and system for providing guidance to individuals in selecting types and amounts of food to be eaten.

BACKGROUND

Providing guidance to people about eating a proper variety of types of foods has long presented a problem. As a result, systems have been developed to advise users about differing types of foods to eat and portion size. These systems typically have been complex, sometimes including use of a computing system containing complex information. These systems often are directed to trying to change behavior and bring about weight loss by following complex types of information provided by such systems.

The U.S. government has been providing an informational program that can be accessed at www.choosemyplate.gov. This U.S. governmental program has sought to help individuals, such as children or caregivers, understand that they should eat differing types of foods, including fruits and vegetables. This program, however, provides information in a relatively complex and inaccessible format, particularly for young children. This program also does not provide information in a format that a child would naturally have to observe when the child, or child's caregiver, is making food selections to put on a plate at meal time.

SUMMARY

Problems exist with prior systems for helping children and their providers learn and use simple information about differing types of foods that should be eaten at differing types of meals. In accordance with an aspect of the invention, a unique food plate system is provided that informs children and others, such as parents, caretakers, providers, and the like, of the differing types, and amounts, of foods to be placed on the plate. As used herein, the term "plate" refers to any dish or platter for serving food.

In some embodiments, the food plate system may provide a lightweight, stackable and easily cleaned and reused set of plates. Each of the plates may have differently shaped food compartments, or bowls, or may include other indicia such as particular designs, that may convey information about the differing types, and amounts, of food to insert, or otherwise place, in each area.

In some embodiments, the food plate system may provide a lightweight, stackable and disposable set of plates, each having differently shaped food compartments, bowls or other indicia, that may convey information about the differing types of food to insert, or otherwise place, in each area. Some systems may provide a differing type of plate for differing types of meals (e.g., breakfast, lunch, dinner, or the like). Some systems may provide a group of differing plates for each type of meal, to provide variety. Certain systems may include indicia in, or adjacent to, one or more of the differing food compartments, bowls or designs. In some applications, the indicia may identify the type and, if desired, amount of food to place in the compartment, bowl or design. The indicia may be fixed or erasable, provided the ink or other indicia is edible or sufficiently stable on the plate surface.

Some systems may provide plate sets directed for use and understanding by children within a certain age ranges, such as 2-4, 5-6, or 10-12 years of age, for example. In some embodiments, the plates may have no more than five or six food type compartments, bowls or designs in each plate in the system.

Some systems may have a compartment, bowl or design for each food type or group that has been identified, such as by the USDA, for consumption at a given meal. Such systems may thus help provide a consistent message to children and their providers, including directly on the plate during food selection or consumption.

In some embodiments, each compartment, bowl or design in a plate may have a peripheral shape indicative of the food type to be paced in the compartment, bowl or design. For example, a periphery of a compartment, bowl or design may be in the shape of an apple to indicate that fruit should be inserted in the compartment, bowl or design, and another periphery of a compartment, bowl or design on the plate may be in the shape of a chicken leg to indicate that meat should be inserted in the compartment, bowl or design. A wide variety of differing, yet commonly understood, shapes may be utilized.

In some embodiments, the compartments, bowls, or designs, or portions of them, may have differing colors indicative of the food that goes in them. For example the apple compartment, bowl or design may be colored red, and the chicken leg compartment, bowl or design may be tan. A wide variety of differing, yet commonly understood, colors can be used. Bright colors may be particularly attractive and enticing, particularly for children.

Some systems may provide similarly appearing information on other items, such as magnets mountable on refrigerators or placemats mountable on tables. These other systems may reinforce the information provided by the plates (if used with a plate system), and they may have the same or similar food shapes, colors, or other indicia on them.

Some systems may provide a software application ("app") that may be downloaded, accessible and usable on any mobile device, which would enable users to enter into the app the types and amounts of foods eaten throughout the day, so that users by the end of the day may receive confirmation whether they have consumed the foods, types of foods, amounts of foods and caloric intake, identified, such as by the USDA, for daily consumption. Such systems may confirm daily dietary consumption with USDA guidelines, based on a child's age, or provide recommendations for foods to be consumed by the end of the day to maintain a diet according to USDA guidelines based on a child's age. Such systems may provide similar confirmations and recommendations on a weekly basis, or other timeframes.

There are other novel features and aspects of the present specification, which will become apparent from the following Specification.

DETAILED DESCRIPTION

While this invention is susceptible to embodiment in many different forms, there will be described herein in detail, specific embodiments thereof with the understanding that the present disclosure is to be considered as an exemplification of the principles of the invention and is not intended to limit the invention to the specific embodiments illustrated.

In this Specification, terms such as "bottom," top," and "side" may be used. It is to be understood that such spatially orienting terms are used solely for ease of description. They thus refer to an orientation of an object in one common ordinary use, but these terms do not require such an orientation in space.

Figure 1:
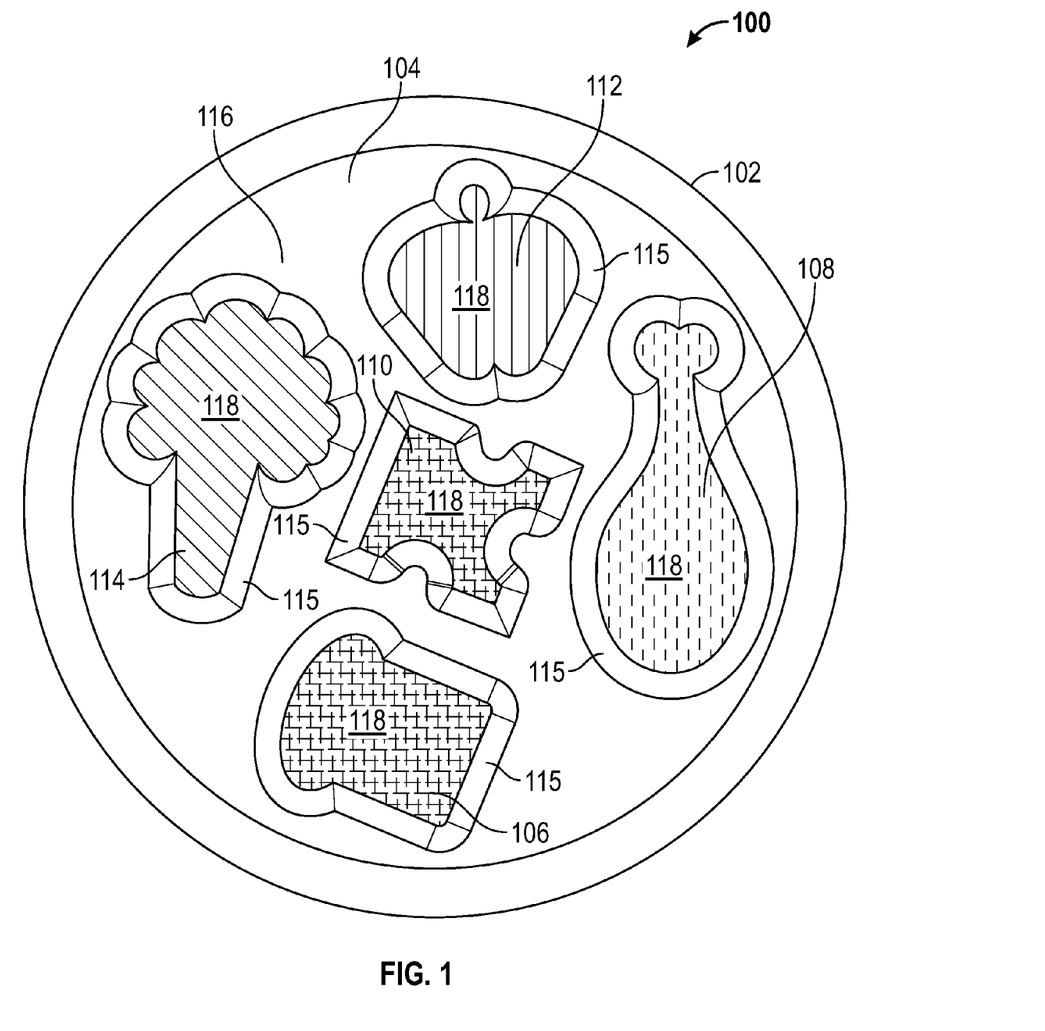
FIG. 1 is a top view of a plate in accordance with the present invention.

A food guide plate 100 in accordance with one embodiment of the present invention is illustrated in FIG. 1. The food guide plate 100 may have a generally circular outer peripheral edge 102 surrounding a plate body 104. The plate body 104 may be segmented, such as by having five food recesses, or bowls, generally designated 106, 108, 110, 112 and 114, which may be molded into the plate body 104. Each of the bowls 106-114 may extend downwardly along an inwardly sloped wall 115, from an upper plate surface 116. In this embodiment, each of the bowls 106-114, may have a food type and quantity identification indicia written with permanent paint or ink on the upper surface of the bottom 118 of the bowls 106-114.

In the case of the embodiment of FIG. 1, the plate 100 may have a yellow-painted bowl 106 with a bread-shaped outer peripheral upper edge (at the junction of the bowl 106 with the plate surface 116), a purple bowl 108 with a chicken-leg-shaped outer peripheral edge, a red bowl 112 with an apple-shaped outer peripheral outer peripheral edge, a green bowl 114 with a broccoli-shaped outer peripheral edge, and a blue bowl 110 with a somewhat swiss-cheese-shaped outer peripheral edge. The bread shape may represent grains; the chicken leg may represent protein; the apple shape may represent fruit; the broccoli shape may represent vegetables; and the cheese shape may represent a dairy product. Other shapes and/or colors, as well as other indicia, may also be utilized in substitution or addition.

The plate 100 may be formed of a unitary, pre-molded white body. The colors and indicia may then be painted and printed, respectively, on the plate 100 after the plate 100 is molded. The plate 100 may be made of ceramic, plastic, or other suitable material that will hold its shape and can be washed and reused many times.

Figure 2:
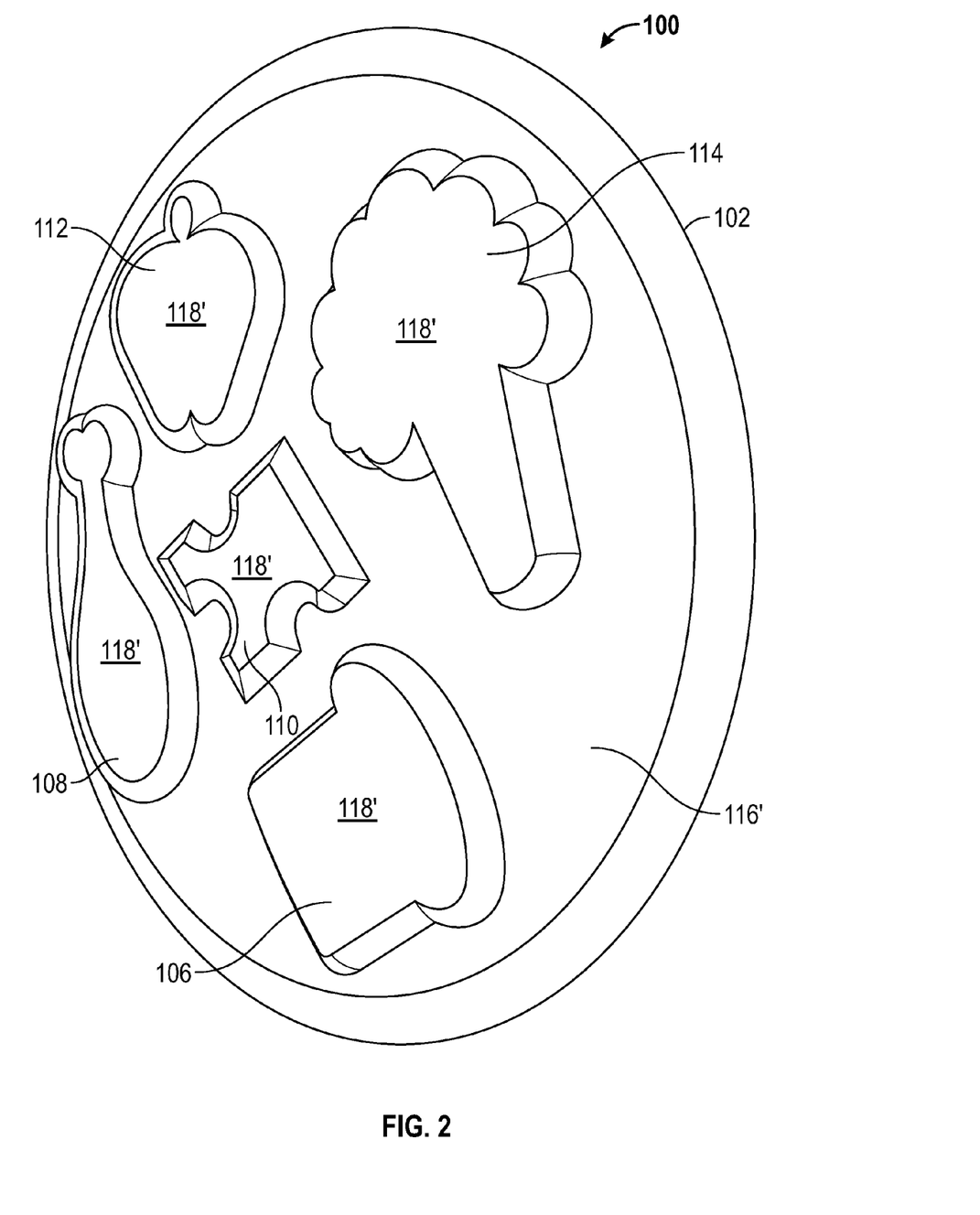
FIG. 2 is a bottom view of the plate of FIG. 1.

Referring to FIG. 2, the plate 100 may have a bottom plate surface 116', including corresponding bowl bottoms 118', which may be spaced in the range of 0.2" to 0.5," preferably 0.3" from the bottom plate surface 116' of the plate body 104.

The plate 100 may be molded of materials having one or more colors other than white. Further the outer peripheral edge 102 of the plate 100 may be other than circular and may be any shape desired, such as rectangular or forming the outline of an animal or other object or entity (not shown).

As discussed above, each of the bowls 106-114 may have a generally flat or planar bottom surface 118' with a sloped side wall extending from the planar bottom surface 188' upwardly to intersect with the plate body 104. Alternatively, the plate 100 may have no bowls/recesses, and may only include images as indicia, such as food shapes, and/or the types of focused indicia disclosed herein.

Figure 3:
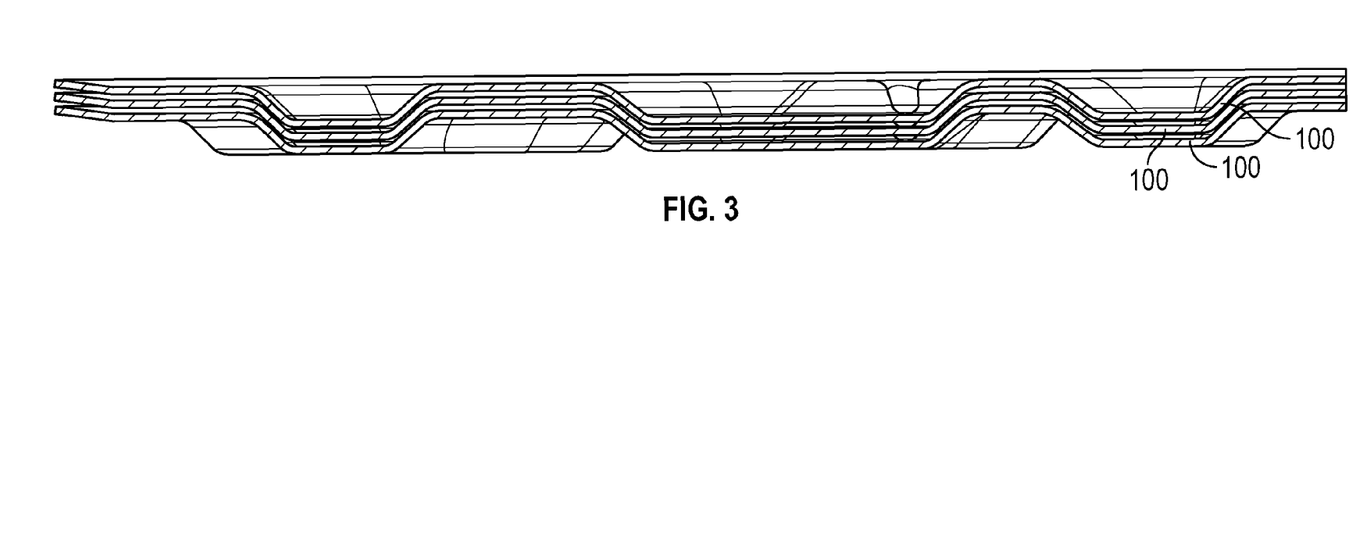
FIG. 3 is a sectional view of three of the plates of FIG. 1, illustrated in a stackable configuration.

As illustrated in FIG. 3, the plates 100 may be stackable, one on top of, and in mating contact, with, each other. Thus a large number of the plates 100 may be stacked on each other and stored in a conventional kitchen cabinet for example.

Figure 4:
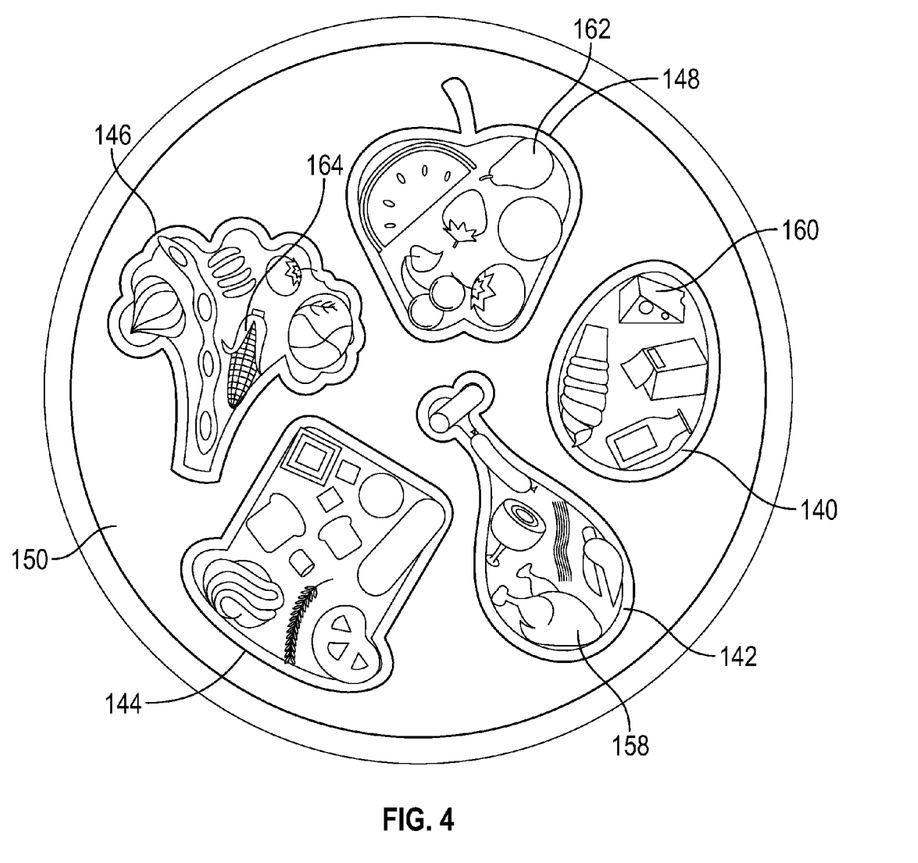
FIG. 4 is a top view of a plate in accordance with the present invention having a configuration different than the configuration of the plate of FIG. 1.

With reference now to FIG. 4, bowls 140, 142, 144, 146 and 148 may have alternative configurations and colors (colors not shown). For example, the food bowl 140 may have an egg-shaped outer periphery; and the food bowl 142 may have a chicken leg shaped outer periphery and an orange color. Other bowl shapes may be used, including bowls having round, triangular or rectangular peripheries. Further a central plate body 150, from which the bowls 142-148 extend downwardly, may be planar.

As also illustrated in FIG. 4, each of the bowls 140-148 may have varying types of indicia printed, or otherwise presented, thereon. The indicia may designate a turkey 158, a piece of cheese 160, a pear 162, an ear of corn 164, or the like, identifying the food type and/or quantity to be placed in the associated one of the bowls 140-148. In this fashion, the same shaped bowl may be used for dinner on differing days, and the plate provides varying dinner foods and/or amounts on varying days. The plate set thus can provide easy directions for a varying, yet balanced, diet, and even for young children with limited reading skills, the food plate may provide information about how the meal should be balanced by food type.

Figure 5:
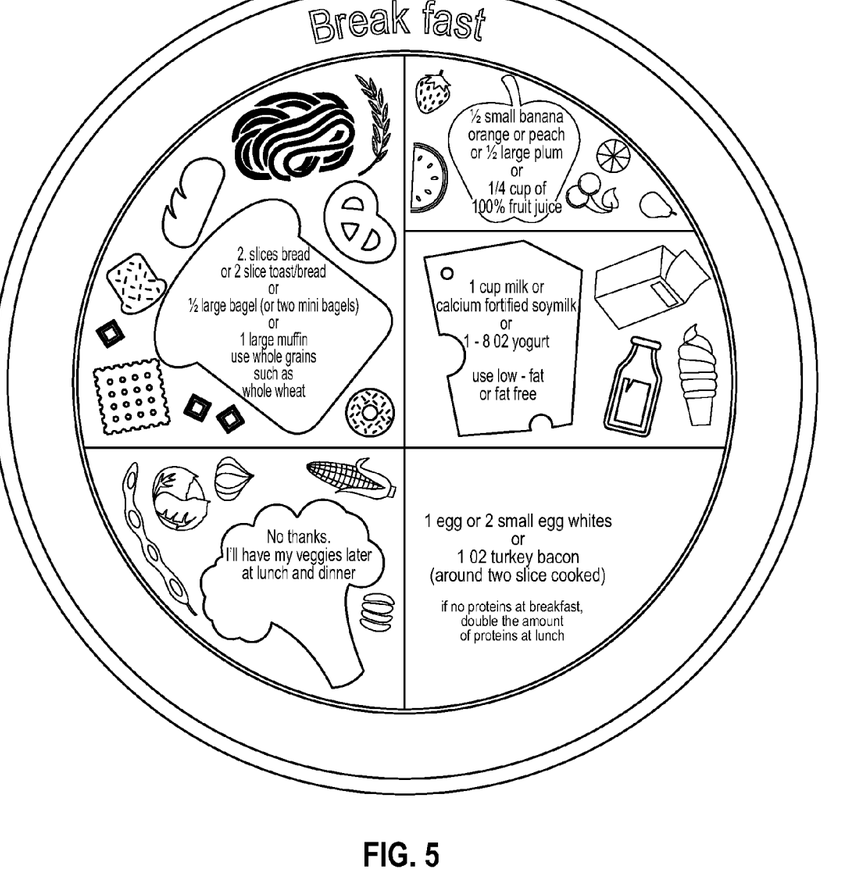
FIG. 5 is a top view of a plate in accordance with another embodiment of the invention.

An alternative embodiment of the invention is illustrated in FIG. 5. According to the embodiment of FIG. 5, rather than bowls defining food type and portion segments, the plate is planer, yet visually segmented, such as by color or other differentiating features. Each of the food type segments may include indicia of foods falling within the particular food type. Each of the food type segments may be proportionally sized, depending on an anticipated amount of food to be placed onto the food type segment. Each of the food type segments may also provide written instruction, such as explaining amounts of typical foods to be placed on each segment.

Each of the plates, among a set of plates, may have the same designs and compartment color schemes, such as for dinner, and may have varying types of indicia identifying the food type and/or quantity to be placed in the associated designs or compartments. In this fashion, the same shaped designs and compartments may be used for each meal on differing days, and the plate provides varying foods and/or amounts on varying days. The plates thus may provide easy directions for a varying yet balanced diet, and even for young children with limited reading skills, the food plate provides information about how the meal should be balanced by food type.

Stackable plates may have the same coloring and shape for a particular type of meal but with differing food-identification indicia marked on the differing plates for differing days, with different rim colors for a particular meal (e.g., yellow for breakfast, red for lunch and blue for dinner), which may allow a user to easily identify which plate should be used for each meal. The plates may be of different sizes depending on age group (e.g., a 10" diameter plate for a 2-3 year old age group and a 12" diameter plate for a 4-8 year old age group), which allows someone to easily identify which plate should be used for each individual.

In this regard, indicating indicia other than words or numbers can be used. For example, a bread-shaped compartment, design or bowl might depict two slices of bread or other types of grains in or around the compartment, design or bowl. Further, use of numbers and words can help children or others learn to read.

The number of and types of plates to be used in a system may vary. For example, in one embodiment, the system may include twenty-one plates of the same type, thus providing for three meals a day for seven days (a week). More plates may be provided for more days or meals, and fewer plates may be provided for fewer days or meals. In another embodiment, the system may include disposable plates that can be reordered, thus providing meals for a infinite number of days.

The shapes of the plates may vary for the differing types of meals. Thus breakfast plates, for example, may have an egg-shaped compartment, design bowl for example. Dinner plates may not have an egg and may have yet other shapes, such as for desert. Or different meals may have the same design to provide for a consistent message, while the indicia within each design may vary based on the actual meal.

The indicia on the set of plates may be varied to provide a balanced and yet varying diet. The system can thus be used to support and implement the USDA, or other, recommendations and/or objectives.

The indicia may be permanently written on the plates, or they may be written on the plates with ink or other printing material that will not harm humans if consumed. Americolor Food Pens may be used for this purpose. Thus the system may be adaptable by the user or provider of the system. Parents, for example, may vary the indicia in the compartments, bowls, designs s or elsewhere on the plate as desired.

Figure 6:
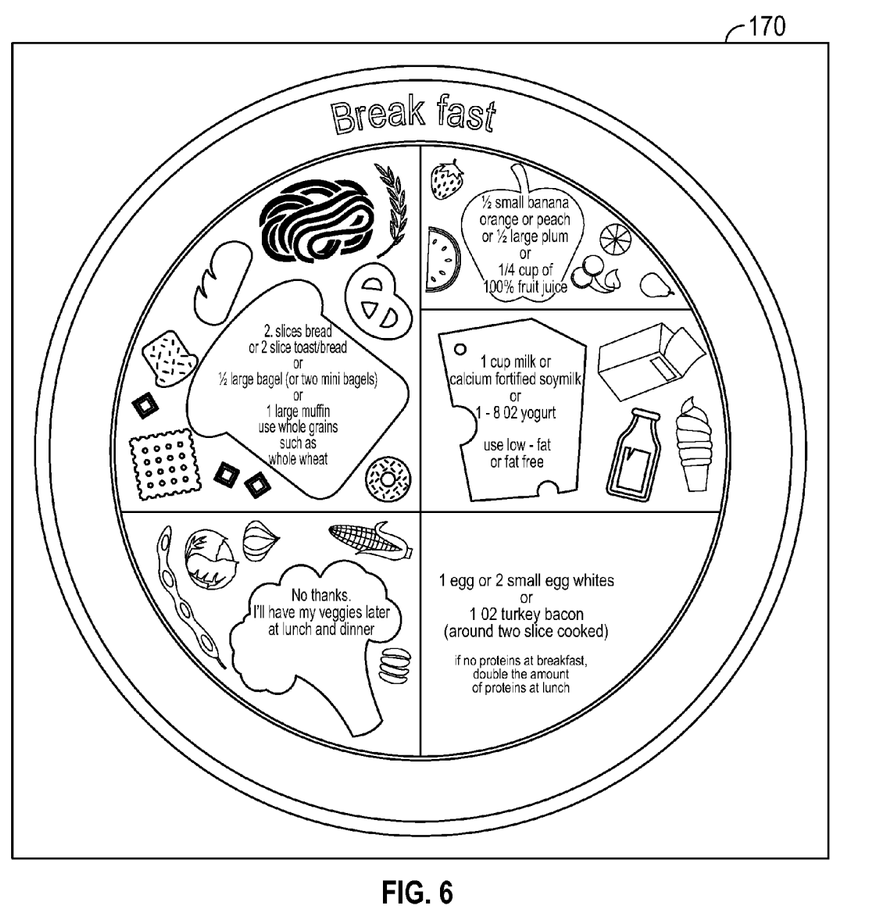
FIG. 6 illustrates an image of the plate of FIG. 5 imposed on a face of a substrate magnet, such as for placement on a refrigerator, which is also illustrative of an image of the plate of FIG. 5 imposed on a face of a substrate placemat or other item.

Referring to FIG. 6, images of the above-described plates may be printed, or otherwise shown, on a substrate 170, which may be a conventional decorative magnet, such as for placing on a refrigerator, a placemat, or the like. The magnet, placemat, or the like, may be washable. The substrate 170 may further be a video display device, such as a computer/tablet/smart phone screen.

The image may be provided to display the desired food types with food shapes on the indicia-bearing surface of the magnets. The magnets may be placed on a refrigerator, for example, for children to observe when assembling a meal. If large enough, the magnets may have indicia illustrated on them to identify types or quantities of food. The indicia may be permanent or temporary ink or other printing material. Erasable ink may be used with magnets having suitable upper surfaces that support wiping of ink or other indicia-bearing material from the surface.

The system may include twenty-one magnets, three (such as breakfast, lunch and dinner) for each of seven days of the week. Alternatively three magnets may be provided, one for each of three meals in a day for example. In addition, one large magnet may include the information otherwise provided by multiple magnets as noted above.

Placemats may be similarly arranged, colored, and informing. The placemats may be made of conventional placemat material, such as plastic, and may be washable and reusable.

Use of the placemats and/or magnets in conjunction with the plate system may reinforce the messages provided by the entire system of plates, magnets, and/or placemats as desired.

Still other forms of similar messaging may be provided. For example, similar images and/or indicia may be printed on substrates such as napkins, silverware, drinking cups, posters for hanging on a wall or any other location that may be of help in conveying appropriate information.

The resulting food information system may be economical to manufacture, easy and economical to order, package, ship, store, use, wash, and maintain, and effective in conveying healthy information about which and/or how much food to consume. The system may be simple to understand and may be adjusted to provide differing messages tailored for differing age groups, including very young children. The system may therefore help teach people of virtually all ages how to have a more balanced diet of food groups, while, if desired, providing food-variety and/or simple quantity information as well. In addition, for plates or other information sources directed to differing age groups, differing coloring or other indicia can be utilized anywhere on the plates to distinguish plates for one age group from another.

The resulting food information system(s) may also provide, include or be accompanied by a software application that may easily be downloaded, accessible and usable on any mobile device, which would enable users to enter into the app the types and amounts of foods eaten throughout the day, so that users by the end of the day could receive confirmation whether they have consumed the foods, types of foods and caloric intake the USDA, or other body, has identified for daily consumption. The app may confirm daily dietary consumption with USDA guidelines, based on a child's age, or provide recommendations for foods to be consumed by the end of the day to maintain a diet according to USDA guidelines based on a child's age. The app could provide similar confirmations and recommendations on weekly bases or other timeframes.

While the plates described above may be unitary plates, the plates may be otherwise. For example, the compartments, bowls or designed areas may be removable and mountable in mating openings via suitable securing structures. In one embodiment of such a system, one or more forms of plate body could be used with a significantly greater number of compartments, bowls or designed areas. For example, three plate shapes (for each of the daily three meals) may be utilized in conjunction with seven days of compartment, bowl or designed area sets for each of the three compartment, bowl or design shapes.

The plates and placemats described above may be washable and reusable. The plates and/or the placemats could instead be made of paper or other disposable materials. Some systems can utilize both types of plates and/or placemats, providing expanded and more consistent messaging and support for consumption of balanced diets.

From the foregoing it will be observed that numerous variations and modifications may be effected without departing from the spirit and scope of the invention. It is to be understood that no limitation illustrated herein is intended, or inferred. It is, of course, intended to cover by the appended claims all such modifications as fall within the scope of the claims.

I claim:

1. A system for assisting a user in selecting food types for a balanced meal, the system comprising:
    a plate having a plurality of food type segments, each of the food type segments associated with a particular one of the food types.,
    wherein the plate includes a plate body having a plurality of plate body openings, and each of the food type segments is defined by a plurality of recessed portion compartments each removably mountable in mating engagement within a respective one of the plate body openings and wherein each recessed portion compartment has different indicia thereon such that a plate having a customized appearance can be formed by mounting a selected compartment within each opening; and wherein each of the recessed recesses compartments is shaped to visually suggest the food type associated with the particular recess for the balanced meal.

2. The system of claim 1, wherein each of the recessed compartments is sized proportional to the associated food type for the balanced meal.

3. The system of claim 1, including a set of the plates, the set including a respective plate associated with each of breakfast, lunch and dinner.

4. The system of claim 3, including a respective set of the recessed portion compartments for each day of a week.

* * * * *